United States Patent Office 2,812,366
Patented Nov. 5, 1957

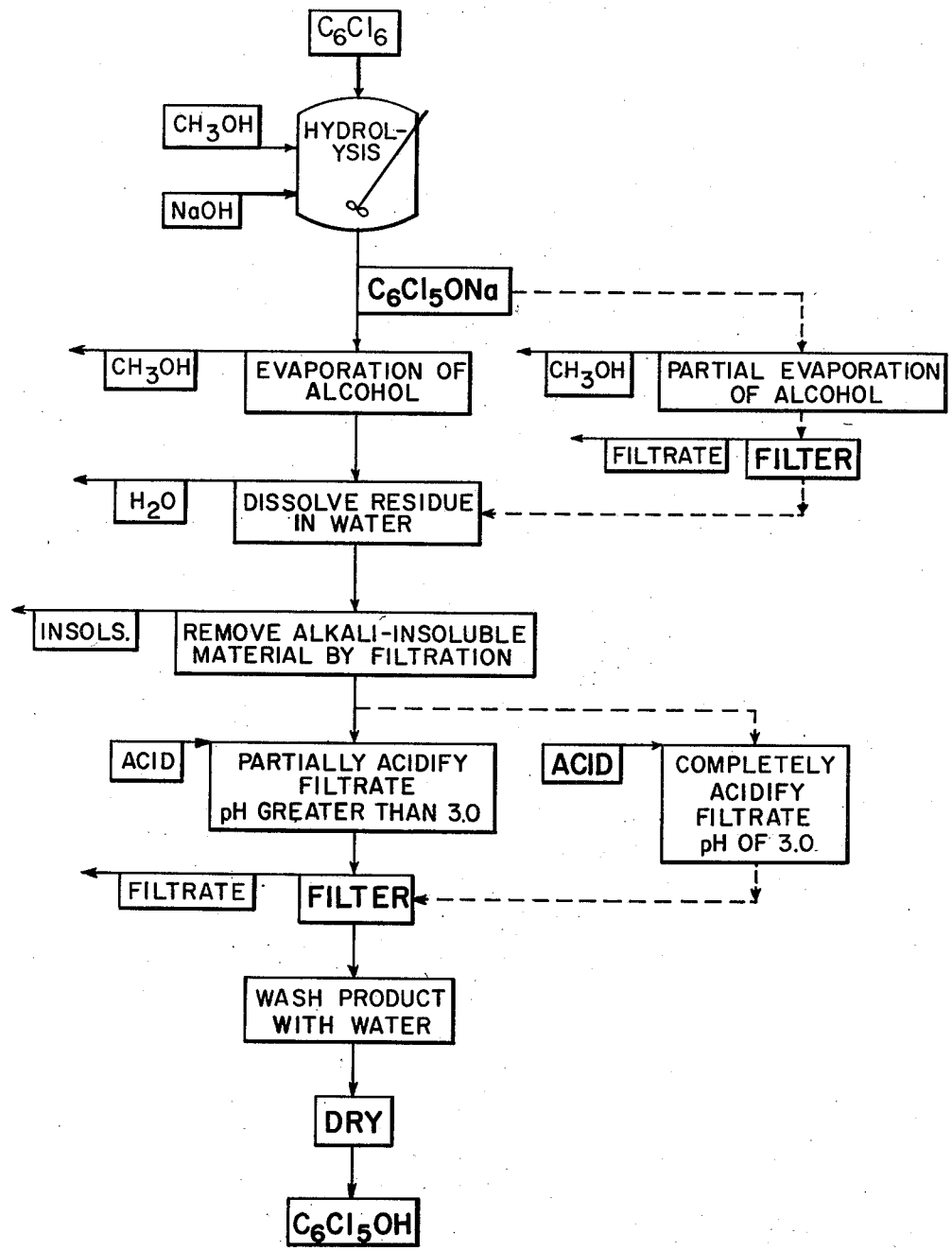

2,812,366

IMPROVEMENTS IN THE PREPARATION OF POLYCHLOROPHENOLS

Irving Rosen, Painesville, Ohio, assignor to Diamond Alkali Company, Cleveland, Ohio, a corporation of Delaware Application April 2, 1954, Serial No. 420,556

5 Claims. (Cl. 260—623)

This invention relates to improvements in the preparation of polychlorophenols by alkaline hydrolysis of polychlorobenzene, and more particularly relates to an improved method of alkaline hydrolysis to produce polychlorophenols of high purity.

Several methods for the hydrolysis of polychlorobenzenes to the corresponding phenols are known and have been used prior to the present invention. However, these prior methods generally have not yielded a product having a purity high enough to render such processes commercially feasible other than in certain specific applications where either the purity of the resultant polychlorophenol is relatively unimportant or the particular application has justified expensive purification methods, such as the selective salting out of the desired pentachlorophenate.

Accordingly, it is the principal object of this invention to avoid the difficulties heretofore encountered in the alkaline hydrolysis of polychlorobenzenes to produce the corresponding polychlorophenols.

Another object of the present invention is to provide a method of producing a polychlorophenol which is characterized by a high degree of purity as evidenced by its melting point.

A further object of the present invention is the provision of a method of purifying the reaction product of an alkaline hydrolysis of a polychlorobenzene to produce a polychlorophenol of high purity.

These and other objects and advantages will appear from the following description of the invention.

It has now been discovered that polychlorophenols, characterized by a high degree of purity as evidenced by their melting points, can be readily and economically prepared by alkaline hydrolysis of a polychlorobenzene, followed by a partial, as contrasted to complete, acidification of the hydrolysis product.

More particularly, the present invention is directed to a method of preparing a polychlorophenol by the alkaline hydrolysis of a polychlorobenzene, the method comprising the steps of reacting a mixture consisting essentially of a polychlorobenzene, a lower volatile alcohol, such as methyl alcohol or ethyl alcohol, an alkali metal hydroxide, such as sodium hydroxide or potassium hydroxide, or the triple salt $NaOH \cdot Na_2SO_4 \cdot NaCl$, evaporating the alcohol from the product of said hydrolysis, dissolving the residue in water, and thereafter removing insoluble material from the resultant water solution. This solution is then only partially acidified with an acid, such as sulfuric acid or a halogen acid, such as hydrochloric acid or hydrobromic acid, and subsequently is filtered. The filter cake is then washed with water to remove adherent acid and salt and is dried to produce substantially pure polychlorophenol.

One modification of the present invention contemplates only partially evaporating the alcohol from the hydrolysis product, thereafter filtering the partially evaporated product, and dissolving the filter cake in water before the above-mentioned partial acidification step. In some instances, it is desirable, after such a partial evaporation of alcohol, to acidify completely the solution obtained by dissolving the filter cake in water.

It will be understood, of course, that while chemically pure compounds may be employed in the practice of the present invention, commercially available or, in fact, relatively crude reagents also may be employed, a higher yield of optimum purity naturally being obtained when substantially pure reagents are used. Hence, in the preparation of pentachlorophenol by the present invention using hexachlorobenzene as a reagent, satisfactory results have been obtained, depending on the product purity desired, using sublimed hexachlorobenzene (M. P. 226° to 228° C.) and crude hexachlorobenzene (M. P. 224° to 226° C.), as well as various so-called "under chlorinated" hexachlorobenzenes (M. P. 204° to 215° C.).

Referring now to the drawing attached hereto and forming a part hereof, there is presented a chemical process flowsheet illustrating the principles of the present invention for the manufacture of pentachlorophenol. It will be appreciated, of course, by those skilled in the art that while the drawing sets forth the principles of the present invention in terms of employing hexachlorobenzene in the manufacture of pentachlorophenol, the present invention also contemplates preparation of other polychlorophenols by alkaline hydrolysis of other polychlorobenzenes, such as trichlorobenzene, tetrachlorobenzene, or pentachlorobenzene.

In the drawing, it will be noted that hexachlorobenzene is mixed with $CH_3OH$ and $NaOH$ in a suitable reactor. The quantities of reagents employed and the conditions under which the hydrolysis takes place are preferably so arranged as to provide a substantially complete hydrolysis. By way of illustration, suitable conditions for a hydrolysis mixture consisting of 1 mol of $C_6Cl_6$, 2.0 to 2.5 mols of $NaOH$, and 600 to 900 ml. of $CH_3OH$ include an operating temperature within the range of about 125° to 175° C., a pressure of about 125 to 360 p. s. i., with a reaction time not in excess of about 3 hours. In certain instances, the reaction time may be as low as 10 to 20 minutes, a typical time being 2 hours. Generally, the amount of alkali-insoluble material present in the hydrolysis product decreases, with a corresponding increase in yield as the reaction time is increased.

The hydrolysis product, which is substantially all sodium pentachlorophenate, is subjected to an evaporation step wherein all of the alcohol is removed. In a modification of the invention which, in many instances, produces a superior product, the hydrolysis product is only partially evaporated so that a portion of the alcohol remains. In such case, the process follows the steps indicated by the broken line on the drawing and the partially evaporated hydrolysis product is filtered to remove the remaining alcohol and its impurity content.

After either complete evaporation or partial evaporation and subsequent filtration, as described above, the hydrolysis residue is dissolved in water. The resulting solution is then filtered to remove, as filter cake, insoluble material, which is primarily impure pentachloroanisole.

The resultant filtrate is then acidified using only enough acid for partial acidification. As used herein, "complete acidification" means acidification to a pH of 3.0, as typically evidenced by the color change from red to blue using Congo red as an indicator, e. g., the so-called "Congo red blue" point. Hence, "incomplete acidification" is used herein to indicate acidification to a pH greater than 3.0. In terms of percentage of complete acidification, the present invention contemplates acidification, generally within the range of about 80% to 90% of complete acidification.

The acidification step may be regulated either by the use of a pH meter or by the addition of a calculated amount of acid insufficient to completely acidify the hydrolysis product. Polychlorophenols exhibiting the high purity of the present invention are also obtained when the hydrolysis product is completely acidified and is subsequently back-titrated with caustic soda to a pH greater than 3.0.

Practice of the present invention contemplates alkaline hydrolysis in an alcoholic medium, followed by a complete evaporation of alcohol with a subsequent partial acidification of the hydrolysis product, or partial evaporation of the alcohol, followed by complete acidification of the hydrolysis product as indicated by the broken line on the drawing, or partial evaporation of the alcohol in the hydrolysis product in combination with a partial acidification step.

Following the acidification step, the resultant material, which is substantially pure pentachlorophenol, is filtered, washed with water, and dried to produce a material having a melting point typically within the range of from 180° to 185° C. with a yield of 90% or greater.

In order that those skilled in the art may better understand the method of the present invention and in what manner the same may be carried into effect, as well as providing the basis for the preferred conditions hereinabove set forth, the following specific examples are offered:

EXAMPLE I

Part A

Into a one-gallon autoclave stainless steel reaction vessel are introduced 1 mol (285 grams) of crude hexachlorobenzene having a melting point of about 224° to 226° C. and 2.5 mols (102 grams) of sodium hydroxide in 640 grams of methanol. The autoclave is then sealed, vented, and stirring and heating are started. When the temperature of the hydrolysis mixture reaches 70° C. the vent is closed. The heating is continued until the mixture is maintained at a temperature within the range of 137° to 140° C., at a pressure of about 130 to 140 p. s. i., for approximately 20 minutes. The heating is then stopped but the stirring is continued for about 50 minutes until the temperature falls to about 90° C., at which time cold water is run through the cooling coils in the stirring apparatus. After cooling, the autoclave contents are removed and the alcohol is removed by evaporation on a steam bath. The solid residue obtained thereby is then dissolved in water and the resultant solution is filtered, giving 24.5 grams of filter cake (impure pentachloroanisole) and 2560 ml. of filtrate.

Part B 750 ml. of the filtrate of Part A is completely acidified with 53 ml. of 18% hydrochloric acid to the Congo red blue point. The acidified product is then filtered. The filter cake is washed with water and dried at 70° C. 70.0 grams of product is obtained having a melting point within the range from 162° to 173° C. and a freezing point of about 169° C.

Part C

To illustrate the difference between the results obtained by incomplete acidification and complete acidification, as described in Part B, 950 ml. of the filtrate (initially having a pH of 12.4 on a pH meter) is incompletely acidified with 60 ml. of 18% hydrochloric acid to a pH of 6.3 on a pH meter. The product is then filtered. The filter cake is washed with water and dried at 70° C. 83.0 grams of product is obtained having a melting point within the range of 168° to 177° C. and a freezing point of about 174° C. It will be observed that this product has a higher purity than the product described in Part B, which is formed by complete acidification of the hydrolysis product.

Part D

The remaining 860 ml. of the original filtrate of Part A is acidified with 52.3 ml. of 18% hydrochloric acid to a pH of 7 on a pH meter. The product is filtered. The filter cake is washed with water and dried at 70° C. 72.5 grams of product is obtained having a melting point range from about 171° to 180° C. and a freezing point of about 176° C.

EXAMPLE II

Part A

One mol (285 grams) of crude hexachlorobenzene (melting point 224° to 226° C.) is charged into an autoclave, together with 2.5 mols (102 grams) of sodium hydroxide and 752 grams of methanol. The resultant mixture is then heated at a temperature within the range from 132° to 135° C., at a pressure of 125 to 135 p. s. i., for about 2 hours. After cooling, the contents of the autoclave are removed.

Part B

About two-thirds of the alcoholic hydrolysis product of Part A is evaporated to dryness on a steam bath. The residue is then dissolved in water and completely acidified to the Congo red blue point with 18% hydrochloric acid. The product is then filtered. The filter cake is washed with water and dried at a temperature of about 70° C. The resultant material has a melting point within the range from about 150° to 162° C.

Part C

The remaining one-third of the alcoholic hydrolysis product of Part A is evaporated to only one-half its original alcoholic volume on a steam bath and is then permitted to cool at room temperature. The resultant material is filtered and the precipitate washed with a few milliliters of alcohol. The precipitate is then dissolved in water and the resultant solution filtered to obtain 0.2 gram of filter cake. The filtrate is then acidified to the Congo red blue point with 47 ml. of 18% hydrochloric acid. The filter cake is filtered, washed with water, and dried at 70° C. The final product weighs 61 grams and has a melting point range from 183° to 187° C.

EXAMPLE III

Part A

One mol (285 grams) of underchlorinated $C_6Cl_6$ is charged into an open autoclave, together with 2.5 mols (102 grams) NaOH and 640 grams of $CH_3OH$. The resulting mixture is heated at a temperature in the range from 135° to 139° C., at a pressure of between 120 to 140 p. s. i., for a total time above 135° C. of 20 minutes. Cooling water is then run through the cooling coils in the autoclave for 90 minutes. The autoclave is opened and the contents are removed as an alcoholic mixture which is evaporated to dryness. The residue of Part A is dissolved in $H_2O$ and the resultant solution is filtered to obtain 2490 ml. of filtrate.

Part B 750 ml. of the filtrate of Part A is completely acidified with 59.2 ml. of 18% HCl to the Congo red blue point (pH of 3.0). The resultant material is separated by filtration, washed with 900 ml. of $H_2O$ and dried on clay plates at 70° C. for 6 hours to obtain 65.5 grams of product having a melting point range of 149° to 164° C. and a freezing point range of about 157 to 162° C.

Part C 900 ml. of the filtrate of Part A is only partially acidified with 59.0 ml. of 18% HCl. The product is filtered, washed once with 900 ml. of $H_2O$ and dried on clay plates at 70° C. for 6 hours to obtain 64.5 grams of product. The melting point range of the product is 169° to 176° C. with a freezing point of about 172° C.

While there have been described various embodiments of the invention, the methods described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of preparing pentachlorophenol by the alkaline hydrolysis of hexachlorobenzene, said method comprising the steps of reacting a mixture consisting essentially of hexachlorobenzene, a substance selected from the group consisting of methyl alcohol and ethyl alcohol, and a material selected from the group consisting of alkali metal hydroxides and $NaOH \cdot Na_2SO_4 \cdot NaCl$ triple salt, evaporating said alcohol from the product of said hydrolysis, dissolving the residue in water, removing insoluble material from the resultant water solution, partially acidifying said solution to effect precipitation of a major proportion, but not all, of said pentachlorophenol and filtering the thus-obtained solution to obtain therefrom substantially pure pentachlorophenol.

2. The method of claim 1 wherein the solution is acidified to a pH greater than 3.0.

3. The method of preparing pentachlorophenol by the alkaline hydrolysis of hexachlorobenzene, said method comprising the steps of reacting a mixture consisting essentially of hexachlorobenzene, a substance selected from the group consisting of methyl alcohol and ethyl alcohol, and a material selected from the group consisting of alkali metal hydroxides and $NaOH \cdot Na_2SO_4 \cdot NaCl$ triple salt under conditions to effect substantially complete hydrolysis of said hexachlorobenzene, evaporating part of said alcohol from the product of said hydrolysis, filtering the residue of the hydrolysis product and dissolving the residue in water, removing insoluble material from the resulting solution, acidifying said solution, filtering said solution, washing the product obtained thereby, and drying to obtain substantially pure pentachlorophenol.

4. The process of claim 3 wherein the solution is acidified to a pH greater than 3.0.

5. The method of purifying the reaction product of the alkaline hydrolysis of hexachlorobenzene in a lower volatile aliphatic alcohol, said method comprising removing alcohol from the alkaline hydrolysis product, dissolving the residual material in water, only partially acidifying the solution of said product to effect precipitation of a major proportion, but not all, of pentachlorophenol, and thereafter removing substantially pure pentachlorophenol therefrom.

References Cited in the file of this patent

UNITED STATES PATENTS

| | | |
|---|---|---|
| 2,107,650 | Smith et al. | Feb. 8, 1938 |
| 2,126,648 | Lofton et al. | Aug. 9, 1938 |
| 2,563,815 | Bruce | Aug. 14, 1951 |
| 2,644,015 | Bartlett | June 30, 1953 |
| 2,748,174 | Jenny et al. | May 29, 1956 |